United States Patent [19]
Hoyt et al.

[11] Patent Number: 5,687,080
[45] Date of Patent: Nov. 11, 1997

[54] MULTIPLE AXIS DATA INPUT APPARATUS AND METHOD

[75] Inventors: Joshua K. Hoyt, Portland; William D. Leppo, Hillsboro, both of Oreg.

[73] Assignee: Ziba Design, Inc., Portland, Oreg.

[21] Appl. No.: 492,655

[22] Filed: Jun. 20, 1995

[51] Int. Cl.$^6$ .................................................. G06K 11/18
[52] U.S. Cl. ..................... 364/190; 345/161; 74/471 XY
[58] Field of Search ........................ 364/190, 709.11; 345/161, 156, 157; 338/128, 118, 2; 463/38; 74/471 XY; 336/135

[56] References Cited

U.S. PATENT DOCUMENTS

| | | | |
|---|---|---|---|
| 3,270,260 | 8/1966 | Mehr | 317/255 |
| 3,886,361 | 5/1975 | Wester | 250/338 |
| 4,459,578 | 7/1984 | Sava et al. | 338/128 |
| 4,462,015 | 7/1984 | Netzer | 336/135 |
| 4,825,157 | 4/1989 | Mikan | 324/208 |
| 4,876,524 | 10/1989 | Jenkins | 338/2 |
| 4,879,556 | 11/1989 | Duimel | 74/471 XY |
| 4,952,919 | 8/1990 | Nippoldt | 340/710 |
| 5,128,671 | 7/1992 | Thomas, Jr. | 341/20 |

FOREIGN PATENT DOCUMENTS

| | | | |
|---|---|---|---|
| 2516296 | 5/1983 | France | H01H 25/00 |
| 9208208 | 5/1992 | WIPO . | |

OTHER PUBLICATIONS

"Keyboard Scanned Capacitive Joy Stick Cursor Control," IBM Technical Disclosure Bulletin, vol. 23, No. 8, Jan. 1981, pp. 3831–3834.

"Positioning and Tracking Controls for the Human Operator", Catalog CS85, Measurement Systems, Inc., Norwalk, CT, pp. cover & 15.

"The Design of Synactic Foam Pressure Housings for Expendable Acoustic Beacons, One Facet of a prototype Oceanographic Current Profiling Inst.", Master's thesis of Joshua K. Hoyt, Massachusetts Institute of Technology, Cambridge, MA, Jun. 1982, pp. cover, 2, and 62–65.

*Primary Examiner*—Reba I. Elmore
*Assistant Examiner*—Steven R. Garland
*Attorney, Agent, or Firm*—Stoel Rives LLP

[57] ABSTRACT

A six axis joystick (110) employs a 13 pole E-core (112) that includes a center pole (114) and four triads of outer poles (116, 118, 120, 122) that protrude from four orthogonally separated arms (124, 126, 128, 130) of the E-core. A drive winding (132) is wound around the center pole of the E-core, and sense windings (134, 136, 138, 140) are wound around each outer pole in each triad of outer poles. A compression spring (144) suspends a ferromagnetic swash plate (142) at substantially equal distances from the center pole and each of the outer poles. A user employs an actuator handle (148) to axially and rotationally deflect the swash plate to assume varying distances from the center pole and each of the outer poles. A varying magnetic flux induced by the center pole is conducted through the swash plate to each of the outer poles to a degree dependent on the spacing between each outer pole and a bottom surface (146) or a periphery (147) of the swash plate. Corresponding signal currents are induced in the sense windings. Each of the signal currents is proportional to the degree of magnetic flux flowing in its associated outer pole. A peak amplitude is detected for each signal current and the differences among the peak amplitudes are used to determine a degree of deflection of the swash plate in each of the X-, Y-, Z-, roll-, pitch-, and yaw-axis directions.

41 Claims, 8 Drawing Sheets

MULTIPLE AXIS DATA INPUT APPARATUS AND METHOD

TECHNICAL FIELD

This invention relates to computer data input devices and more particularly to an apparatus and a method in which joystick motion is sensed for up to six degrees of freedom.

BACKGROUND OF THE INVENTION

The ever-improving performance of computers and computer programs has spawned a corresponding need for higher capability user input devices. Computer application programs for three-dimensional mechanical design, flight simulation, and consumer-oriented games all demand multiple degree-of-freedom (hereafter "axis") data input. However, prior computer input devices, such as joysticks, trackballs, graphic tablets, and mice are limited by their construction to two or three axis operation, whereas up to six axis operation is desirable in many applications.

FIG. 1 shows the six axes as three mutually perpendicular translational motion axes (hereafter referred to as an X-axis, a Y-axis, and a Z-axis) and three mutually perpendicular rotational motion axes (hereafter referred to as a roll axis, a pitch axis, and a yaw axis). Skilled workers typically refer to roll as an angular rotation about the X-axis, pitch as an angular rotation about the Y-axis, and yaw as an angular rotation about the Z-axis.

A joystick typically employs a user-positioned actuator handle pivoted about a fixed point to actuate two mutually perpendicular potentiometers that generate respective X- and Y-axis data. In some joysticks, springs are employed to return the actuator handle to a centered position. However, potentiometers have friction that leads to unrepeatable data generation and difficulty in "zeroing" the joystick.

As a result, other workers have employed optical encoders, switch arrays, piezo-electric transducers, strain-gauges, capacitive coupling devices, inductive coupling devices, and magnetic devices to circumvent the electromechanical problems inherent in potentiometers. Unfortunately, none of these devices inherently provides any additional axes of operation, some are too costly for consumer-oriented data input applications, and others unduly restrict actuator motion, which degrades user "feel."

A mouse typically employs a user-positioned ball that rolls in constraining bearings to frictionally rotate two mutually perpendicular devices, such as optical encoders that generate respective X- and Y-axis data. Because the mouse moves on a flat surface, only two axes of data are generated. However, a mouse typically incorporates at least one additional user-actuated button that may be used to change the operating mode of the mouse. For example, the X- and Y-axis translation data may be converted to roll and pitch data when the button is depressed. Of course, the addition of buttons does not change the fact that the mouse is limited to operating in only two axes at a time. Moreover, the bearings and frictional couplings are prone to irregular rotation caused by accumulated contaminates that are picked from the flat surface by the ball.

A three axis input device is described in U.S. Pat. No. 4,952,919 for TRACKBALL MECHANISM. A trackball can be thought of as an inverted mouse in which the ball is directly accessible to user manipulation. In this particular trackball, the ball rolls in constraining bearings that are positioned to expose to user manipulation a majority of the ball surface area. Moreover, the ball frictionally rotates three mutually perpendicular optical encoders that generate respective X-, Y-, and Z-axis (or alternatively roll-, pitch-, and yaw-axis) data.

An exemplary four axis input device is the model 426-G811 Four Axis Control manufactured by Measurement Systems, Inc., of Norwalk, Connecticut. The Four Axis Control is a potentiometer-based joystick in which the actuator handle is movable in the X-, Y-, and Z-axis directions and is rotatable about the Z-axis. The four axes of motion are each coupled to potentiometers that produce X-, Y-, and Z-axis translational data and yaw-axis rotational data. Of course, the Four Axis Control is costly and has the typical disadvantages associated with potentiometers and their associated coupling mechanisms.

What is needed, therefore, is an inexpensive user input device that has good user feel, senses more than four axes of motion applied to a single actuator handle, and responds by generating accurate and repeatable input data.

SUMMARY OF THE INVENTION

An object of this invention is, therefore, to provide a multiple axis, single actuator data input apparatus and method.

Another object of this invention is to provide a multiple axis data input apparatus and method that generate accurate and repeatable input data.

A further object of this invention is to provide a multiple axis data input apparatus having low friction and good user feel.

Still another object of this invention is to provide an inexpensive, multiple axis data input apparatus and method.

An embodiment of a six axis joystick employs a 13 pole E-core that includes a center pole and four triads of outer poles that protrude from four orthogonally separated arms of the E-core. A drive winding is wound around the center pole of the E-core, and sense windings are wound around each of the outer poles. A compression spring suspends a ferromagnetic swash plate at substantially equal distances from the center pole and each of the outer poles. A user employs an actuator handle to axially and rotationally deflect the swash plate to assume varying distances from the center pole and each of the outer poles. A varying magnetic flux induced by the center pole is conducted through the swash plate to each of the outer poles to a degree dependent on the spacing between each outer pole from a bottom surface or a periphery of the swash plate. Corresponding signal currents are induced in the sense windings. Each of the signal currents is proportional to the degree of magnetic flux flowing in its associated outer pole. A peak amplitude is detected for each signal current, and the differences among the peak amplitudes are used to determine a degree of deflection of the swash plate in each of the X-, Y-, Z-, roll-, pitch-, and yaw-axis directions.

In a preferred embodiment, the E-core is replaced by discrete inductors mounted to a circuit board, or in an alternative embodiment, by Hall-effect devices that sense permanent magnets that are attached to a non-ferromagnetic swash plate. Also, user feel may be improved by replacing the compression spring with a flexible diaphragm, a rubber bladder, or preferably, a suspension cage.

Additional objects and advantages of this invention will be apparent from the following detailed description of preferred embodiments thereof that proceed with reference to the accompanying drawings.

DETAILED DESCRIPTION OF PREFERRED EMBODIMENTS

Figure 1:
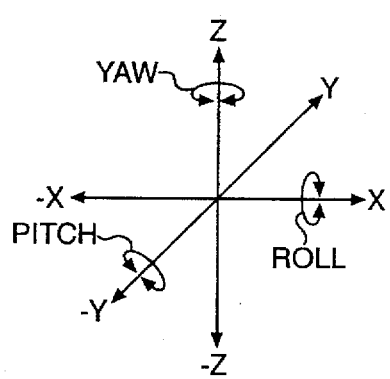
FIG. 1 is a diagram showing three mutually perpendicular translational motion axes and three mutually perpendicular rotational motion axes.
Figure 2A:
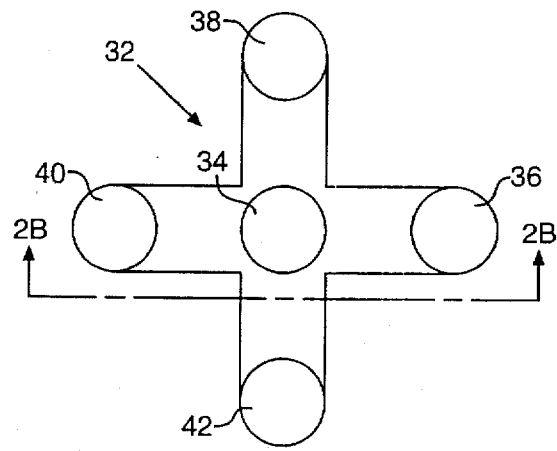
FIG. 2A is a top plan view of an E-core employed in a two axis inductively coupled joystick of this invention.
Figure 2C:
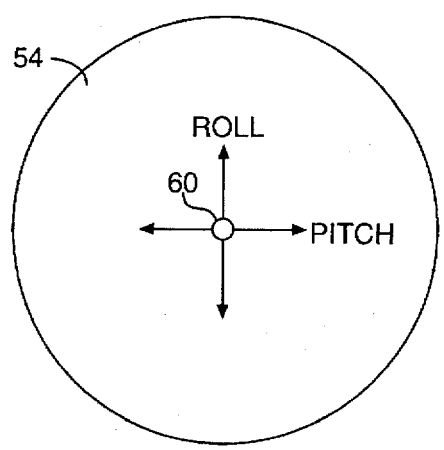
FIG. 2C is a top plan view showing a generally circular shape of the swash plate of FIG. 2B.
Figure 2B:
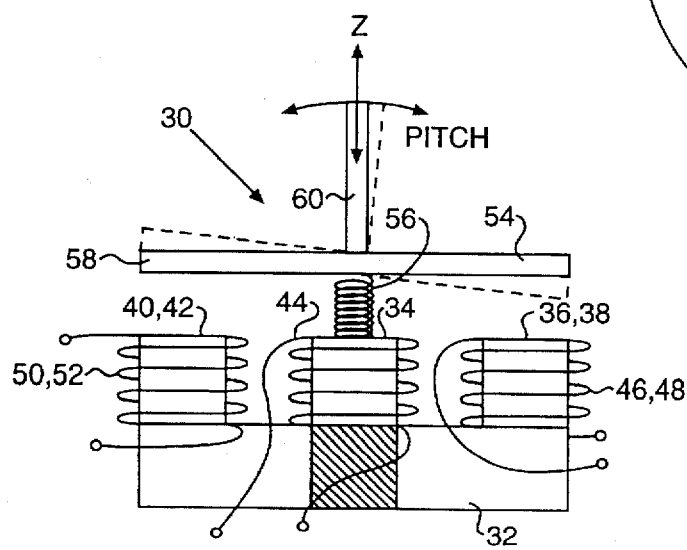
FIG. 2B is a sectional view of the E-core taken along lines 2B—2B of FIG. 2A, further showing a swash plate, a spring, and coupling coils of the two axis inductively coupled joystick of this invention.

FIGS. 2A–2C show a two axis joystick 30 in which a five pole E-core 32 includes a center pole 34 and four outer poles 36, 38, 40, and 42 that are arranged around center pole 34 as orthogonally separated pairs of outer poles. A drive winding 44 is wound around center pole of five pole E-core 32, and sense windings 46, 48, 50, and 52 are wound around respective outer poles 36, 38, 40, and 42.

A swash plate 54 (FIG. 2C) is a substantially circular plate of ferromagnetic material suspended by a compression spring 56 such that, at an equilibrium position (shown in solid lines in FIG. 2B), a bottom surface 58 of swash plate 54 is substantially equidistant from center pole 34 and each of outer poles 36, 38, 40, and 42. An actuator handle 60 is attached to swash plate 54 by which a user deflects swash plate 54 (as shown, for example, in a pitch-axis direction in dashed lines in FIG. 2B), thereby causing bottom surface 58 to assume varying distances from center pole 34 and each of outer poles 36, 38, 40, and A driver (not shown) causes an alternating current to flow in drive winding 44, thereby inducing a corresponding magnetic flux in center pole 34 and swash plate 54. The magnetic flux induced in swash plate 54 is conducted through each of outer poles 36, 38, 40, and 42 to a degree dependent on the spacing of each pole from bottom surface 58 of swash plate 54. Corresponding signal currents are induced in sense windings 46, 48, 50, and 52. Each of the signal currents is proportional to the degree of magnetic flux flowing in its associated pole. A peak amplitude is detected for each signal current, and the differences among the peak amplitudes are used to determine a degree of deflection of swash plate 54 in, for example, the roll- and pitch-axis directions.

Because swash plate 54 is suspended by compression spring 56, a significant amount of the deflection of swash plate 54 may also be in the X- and Y-axis directions. However, the geometric configuration of two axis joystick 30 prevents effective detection of such deflections. Nevertheless, deflection of swash plate 54 in the Z-axis direction is readily determined from "common-mode" signal components generated by opposed pairs of the sense windings, such as, for example, sense windings 46 and 50. Therefore, two axis joystick 30 may be considered to be a three axis joystick, and, of course, the roll- and pitch-axis related signals may be readily converted to represent X-and Y-axis translations of actuator handle 60.

Figure 3A:
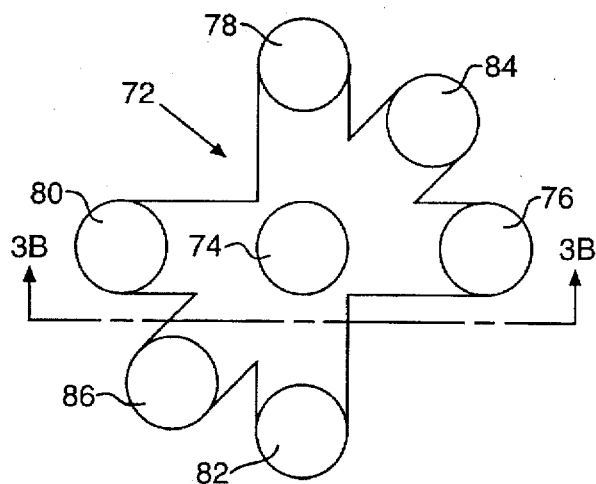
FIG. 3A is a top plan view of an E-core employed in a three axis inductively coupled joystick of this invention.
Figure 3C:
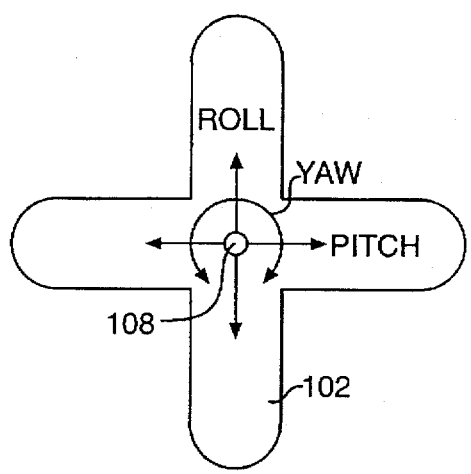
FIG. 3C is a top plan view showing a generally "crossed" shape of the swash plate of FIG. 3B.
Figure 3B:
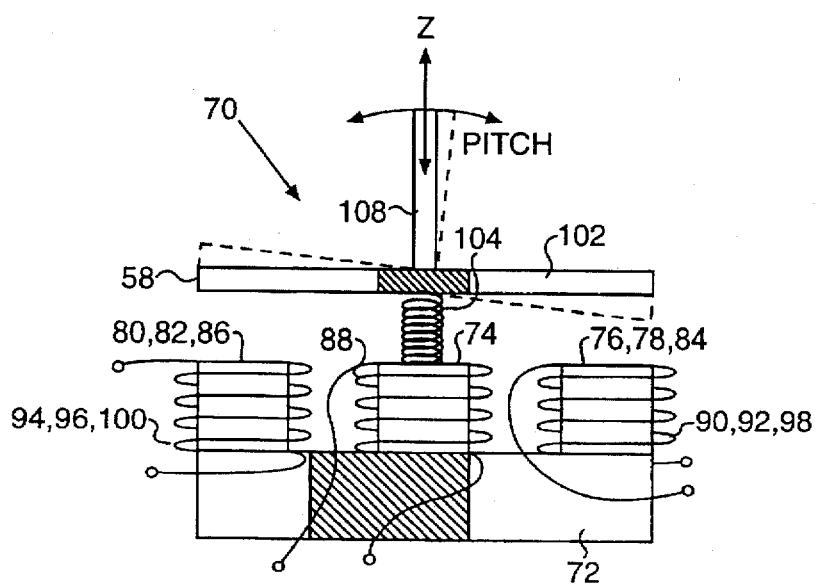
FIG. 3B is a sectional view of the E-core taken along lines 3B—3B of FIG. 3A, further showing a swash plate, spring, and coupling coils of the three axis inductively coupled joystick of this invention.

FIGS. 3A–3C show a three axis joystick 70 in which a seven pole E-core 72 includes a center pole 74, four outer poles 76, 78, 80, and 82 that are arranged around center pole 74 as orthogonally separated pairs of poles, an offset outer pole 84 that is positioned between outer poles 76 and 78, and an offset outer pole 86 that is positioned between outer poles 80 and 82. A drive winding 88 is wound around center pole 74 of seven pole E-core 72, and sense windings 90, 92, 94, 96, 98, and 100 are wound around respective outer poles 76, 78, 80, 82, 84, and 86.

A swash plate 102 (FIG. 3C) is a substantially "cross-shaped" plate of ferromagnetic material suspended by a compression spring 104 such that, at an equilibrium position (shown in solid lines in FIG. 3B), a bottom surface 106 of swash plate 102 is substantially equidistant from center pole 74 and each of outer poles 76, 78, 80, 82, 84, and 86. An actuator handle 108 is attached to swash plate 102 by which a user axially and rotationally deflects swash plate 102 (as shown, for example in a pitch-axis direction in dashed lines in FIG. 3B), thereby causing bottom surface 106 to assume varying distances from center pole 74 and each of the outer poles.

As described with reference to two axis joystick 30, a driver (not shown) causes an alternating current to flow in drive winding 88, thereby inducing a corresponding magnetic flux in center pole 74 and swash plate 102. The magnetic flux induced in swash plate 102 is conducted through each of outer poles 76, 78, 80, and 82 to a degree dependent on the pitch- and roll-axis-induced spacing of each respective pole from bottom surface 106 of swash plate 102 and through each of offset outer poles 84 and 86 to a degree dependent on the yaw-axis-induced spacing of each respective pole from bottom surface 106 of swash plate 102. Corresponding signal currents are induced in sense windings 90, 92, 94, 96, 98, and 100. Each of the signal currents is proportional to the degree of magnetic flux flowing in its associated outer pole. A peak amplitude is detected for each signal current, and the differences among the peak amplitudes are used to determine a degree of deflection of swash plate 102 in, for example, the roll-, pitch-, and yaw-axis directions.

Because swash plate 102 is suspended by compression spring 104, a significant amount of deflection of swash plate 102 may also be in the X- and Y-axis directions. However, the geometric configuration of three axis joystick 70 is more conducive to detecting rotational axis deflections. Nevertheless, as for two axis joystick 30 (FIG. 2B), deflection of swash plate 102 in the Z-axis direction is readily determined from "common-mode" signal components generated by opposed pairs of the sense windings, such as, for example, sense windings 90 and 94. Therefore, three axis joystick 70 may be considered to be a four axis joystick, and, of course, the roll- and pitch-axis related signals are easily converted to represent X- and Y-axis translation of actuator handle 60.

Figure 4A:
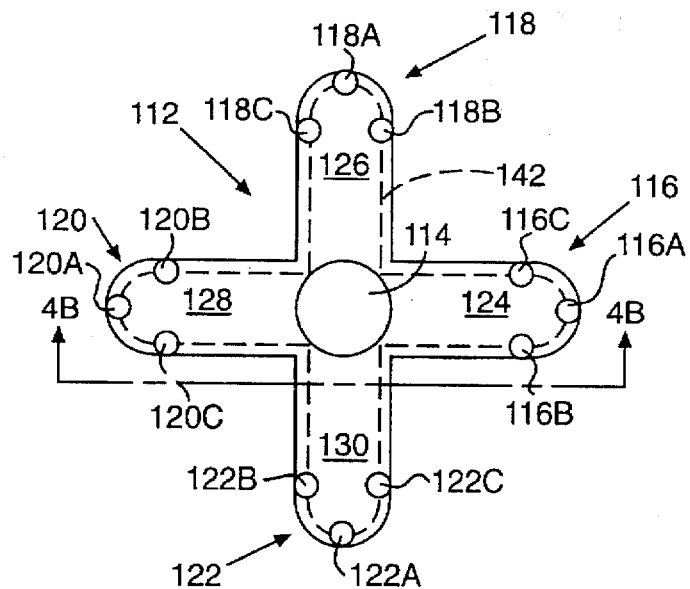
FIG. 4A is a top plan view of an E-core employed in a first embodiment of a six axis inductively coupled joystick of this invention.
Figure 4C:
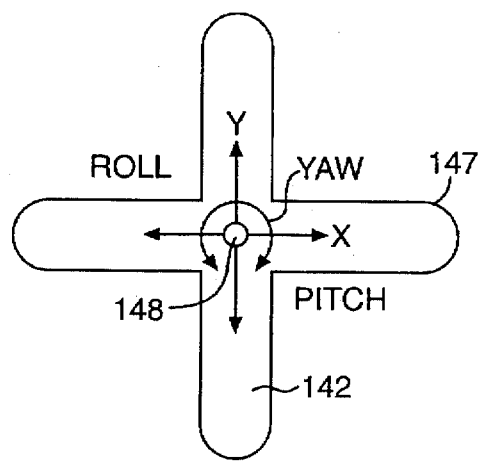
FIG. 4C is a top plan view showing the generally "crossed" shape of the swash plate of FIG. 4B.
Figure 4B:
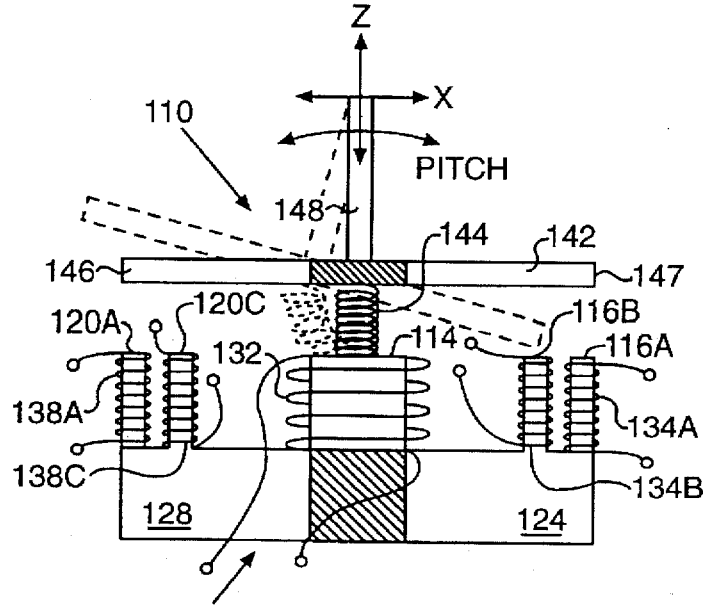
FIG. 4B is a sectional view of the E-core taken along lines 4B—4B of FIG. 4A, further showing a swash plate, a spring, and coupling coils of the first embodiment of the six axis inductively coupled joystick of this invention.

FIGS. 4A–4C show a six axis joystick 110 in which a 13 pole E-core 112 includes a center pole 114 and four triads of outer poles 116, 118, 120, and 122 that are arranged such that each triad of poles protrudes from an associated end of four orthogonally separated arms 124, 126, 128, and 130 of 13 pole E-core 112. (Each corresponding pole in the four triads of poles 116, 118, 122, and 122 is identified by a letter suffix A, B, or C.) A drive winding 132 is wound around center pole 114 of 13 pole E-core 112, and 12 sense windings 134A–134C, 136A–134C, 138A–134C, and 140A–134C (only 134A, 134B, 138A, and 138C are shown) are wound around respective poles in the four triads of outer poles 116, 118, 120, and 122. (Each sense winding is identified by the letter suffix of its associated pole.)

A swash plate 142 (FIG. 4C) is a substantially "cross-shaped" plate of ferromagnetic material suspended by a compression spring 144 such that, at an equilibrium position (shown in solid lines in FIG. 4B), a bottom surface 146 of swash plate 142 is substantially equidistant from center pole 114 and each of the outer poles. The major dimensions of swash plate 142 are sized (as shown in dashed lines in FIG. 4A) to be slightly smaller than the corresponding dimensions of 13 pole E-core 112 such that, at the equilibrium position, a periphery 147 is substantially aligned with the axial centers of each of the outer poles. An actuator handle 148 is attached to swash plate 142 by which a user axially and rotationally deflects swash plate 142 (as shown in dashed lines, for example, in X-, Z-, and pitch-axis directions in FIG. 4B), thereby causing bottom surface 146 to assume various distances from center pole 114 and each of the outer poles.

As described with reference to joysticks 30 and 70, a driver (not shown) causes an alternating current to flow in drive winding 132; thereby inducing a corresponding magnetic flux in center pole 114 and swash plate 142. The magnetic flux induced in swash plate 142 is conducted through each of the 12 outer poles to a degree dependent on the rotational and translational-axis-induced spacing of each respective pole from bottom surface 146 and periphery 147 of swash plate 142. Corresponding signal currents are induced in sense windings 134A–134C, 136A–134C, 138A–134C, and 140A–140C. Each of the signal currents is proportional to the degree of magnetic flux flowing in its associated outer pole. A peak amplitude is detected for each signal current, and the differences among the peak amplitudes are used to determine a degree of deflection of swash plate 142 in X-, Y-, Z-, roll-, pitch-, and yaw-axis directions.

Six axis data generation is possible because the configuration of triads Of outer poles 116, 118, 120, and 122 causes relatively large spacing differences to occur between combinations of bottom surface 146, periphery 147, and the outer poles in response to translational and rotational deflections of swash plate 142.

Compression spring 144 allows swash plate 146 to move freely through a large displacement range, provides deflection resistance that is proportional to the displacement, provides spring return to the equilibrium position, and enables building six axis joystick 110 with few moving parts.

Figure 5A:
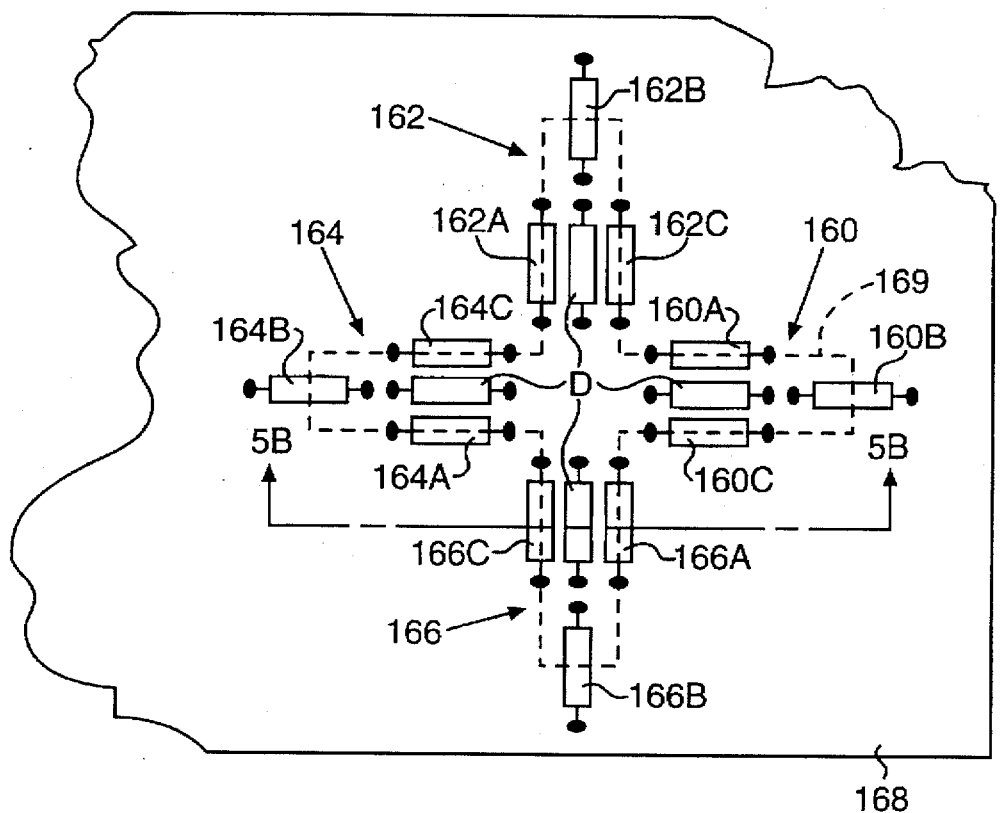
FIG. 5A is a top plan view showing a second embodiment of the six axis inductively coupled joystick of FIG. 4 in which the E-core is replaced by discrete inductors mounted to a circuit board.
Figure 5B:
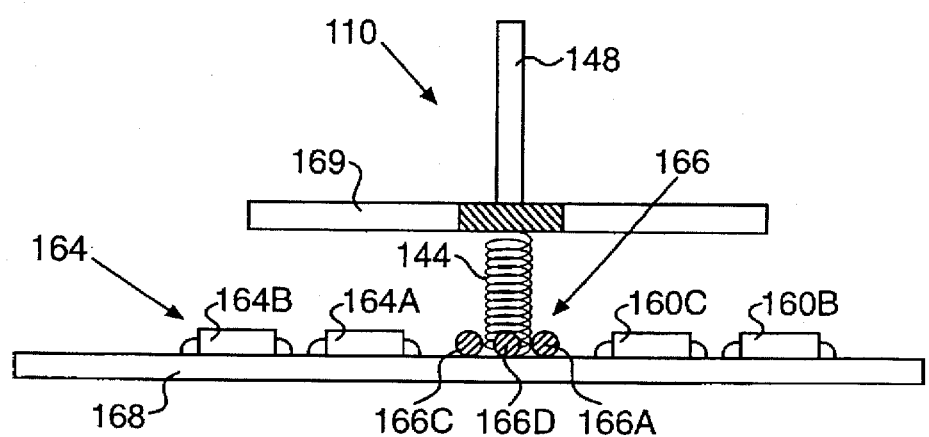
FIG. 5B is a sectional view of the discrete inductors and circuit board taken along lines 5B—5B of FIG. 5A, further showing a swash plate and spring of the second embodiment of the six axis inductively coupled joystick of this invention.

FIGS. 5A and 5B show a preferred alternative embodiment of six axis joystick 110 in which 13 pole E-core 112 is replaced by discrete inductor arrays 160, 162, 164, and 166 that are mounted to a circuit board 168. Each inductor array includes a driver inductor D surrounded by sense inductors A, B, and C that are arranged in positions functionally corresponding to the positions of the outer poles of 13 pole E-core 112. Driver inductors D functionally replace drive winding 132. Each inductor is preferably a commercially available 220 microhenry, axial leaded component.

FIG. 5A shows (in dashed lines) a cross-shaped swash plate 169 formed from a ferromagnetic material, preferably steel. Swash plate 169 is preferably sized to overlay the approximate centers of sense inductors 160A–160C, 162A–162C, 164A–164C, and 166A–166C. In the FIG. 5 embodiment, each cross arm of swash plate 169 has a tip-to-tip length of about 3.75 centimeters, a width of about 0.5 centimeter, and a thickness of about 1.6 millimeters. In the equilibrium position shown in FIG. 5B, swash plate 169 is suspended above discrete inductor arrays 160, 162, 164, and 166 by a distance of about 0.5 centimeter to about 2.0 centimeters.

A driver, such as one described below with reference to FIG. 10, sequentially causes an alternating current to flow in driver inductors 160D, 162D, 164D, and 166D, thereby inducing a corresponding magnetic flux in each arm of swash plate 169. The magnetic flux induced in swash plate 142 is conducted through and induces signal currents in each of the 12 sense inductors 160A–160C, 162A–162C, 164A–164C, and 166A–166C to a degree dependent on the rotational and translational-axis-induced spacing of each respective discrete inductor from swash plate 169. A peak amplitude is detected for each signal current, and the differences among the peak amplitudes are used to determine a degree of deflection of swash plate 142 in X-, Y-, Z-, roll-, pitch-, and yaw-axis directions.

Figure 6A:
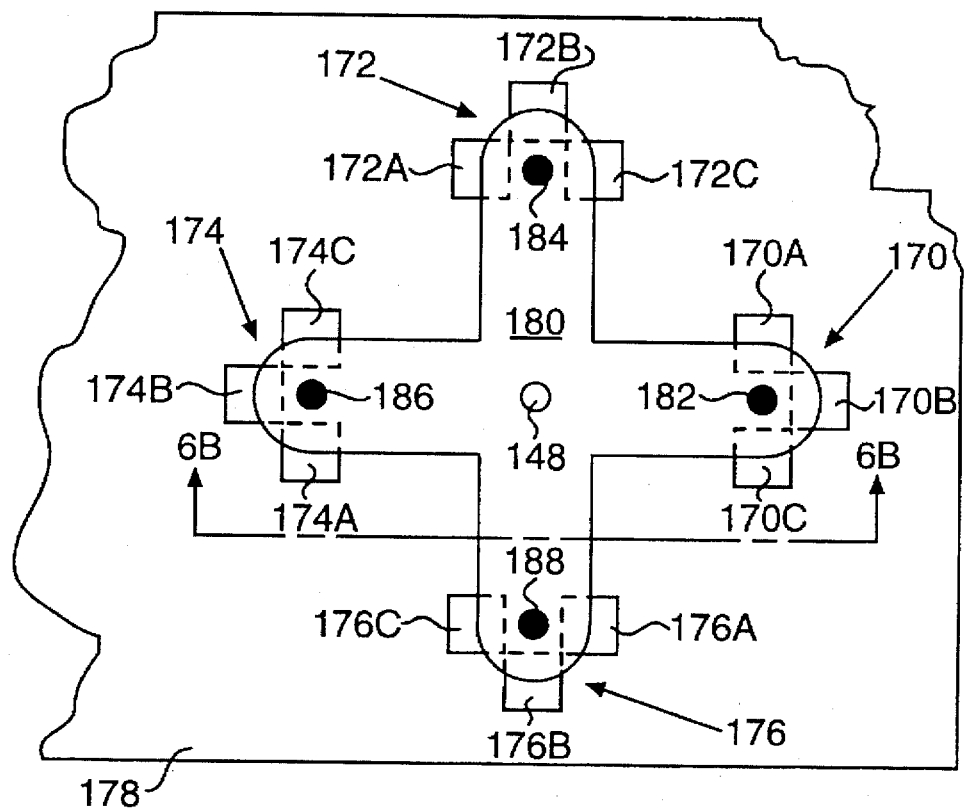
FIG. 6A is a top plan view showing an alternative embodiment of the six axis joystick of FIG. 5 in which the discrete inductors are replaced by. Hall-effect devices, and in which permanent magnets are mounted in a non-ferromagnetic swash plate.
Figure 6B:
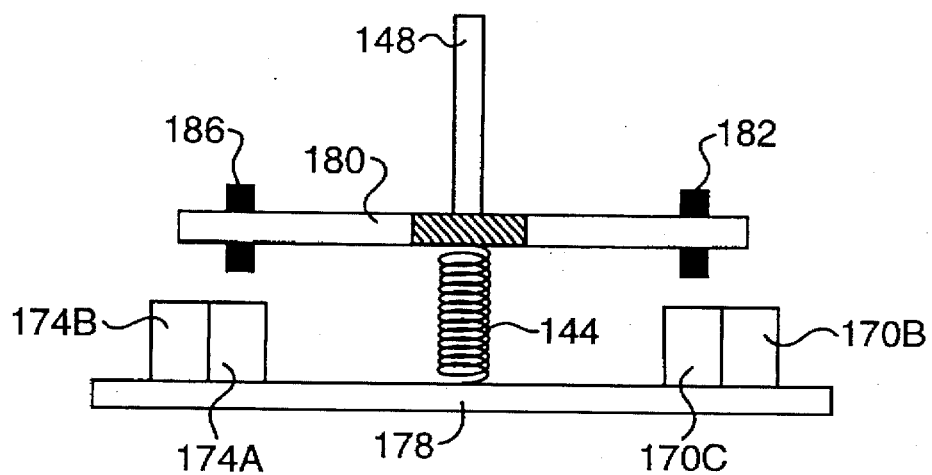
FIG. 6B is a sectional view taken along lines 6B—6B of FIG. 6A, showing the Hall-effect devices, permanent magnets, swash plate, and circuit board, and further showing the spring of the alternative embodiment of the six axis joystick of FIG. 5.

FIGS. 6A and 6B show a second alternative embodiment of six axis joystick 110 in which 13 pole E-core 112 is replaced by Hall-effect sensor arrays 170, 172, 174, and 176 that are mounted to a circuit board 178. Each Hall-effect sensor array includes individual Hall-effect sensors A, B, and C that are arranged in positions functionally corresponding to the positions of the outer poles of 13 pole E-core 112.

Art arbitrarily shaped swash plate 180 (an exemplary crossed shape is shown in FIG. 6A) is a plate of nonferromagnetic material in which permanent magnets 182, 184, 186, and 188 are embedded such that, at an equilibrium position (shown in FIG. 6B), permanent magnets 182, 184, 186, and 188 are substantially equidistant from their associated Hall-effect sensors A, B, and C in Hall-effect sensor arrays 170, 172, 174, and 176. Operationally, permanent magnets 182, 184, 186, and 188 functionally replace drive winding 132, and Hall-effect sensor arrays 170, 172, 174, and 176 functionally replace triads of outer poles 116, 118, 120, and 122.

The Hall-effect sensed embodiment is less sensitive than the inductively sensed embodiment to displacements of actuator handle 148, but may be more suitable for use in certain applications.

Figure 7:
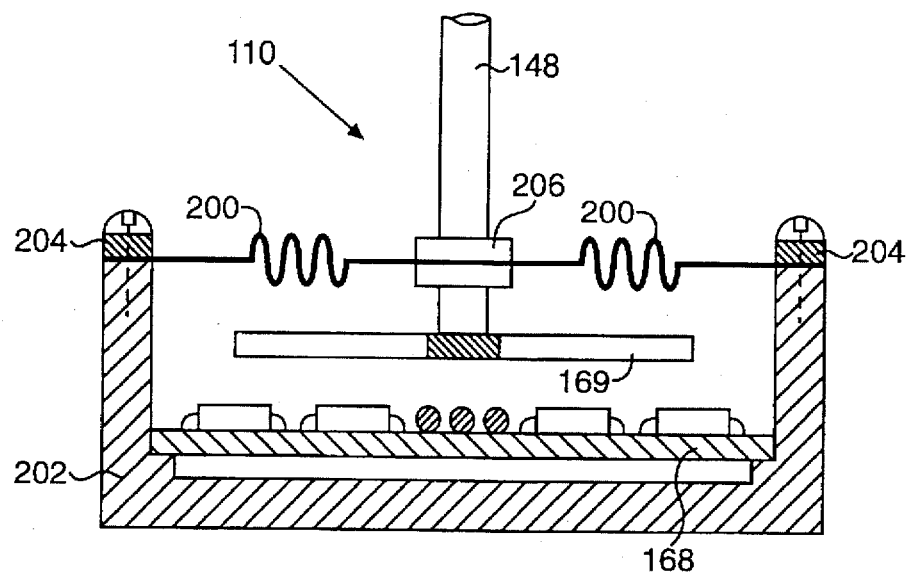
FIG. 7 is a cross-sectional side view of the discrete inductor embodiment of the six axis joystick of FIG. 5, in which the spring is replaced by a flexible diaphragm.

FIG. 7 shows an alternative embodiment of six axis joystick 110 of FIG. 5 in which compression spring 144 is replaced by a flexible diaphragm 200 formed from a pliable material, such as rubber. In this embodiment, circuit board 168 is enclosed in a housing 202 to which flexible diaphragm 200 is attached by a retaining ring 204. Actuator handle 148 is secured to flexible diaphragm 200 by a collar 206.

Flexible diaphragm 200, in a manner similar to compression spring 144, allows swash plate 142 to move in six degrees of freedom with a single moving part, imparts to actuator handle 148 an equilibrium position restoring force, and introduces substantially no displacement friction. Further benefits of flexible diaphragm 200 include mechanical isolation of circuit board 168 from swash plate 142 to provide improved manufacturability of joystick 110 and layout flexibility of circuit board 168; environmental isolation of circuit board 168 from contaminants, such as dust, dirt, and liquids; electrical isolation of circuit board 168 from susceptibility to or emission of electromagnetic fields; and improved user feel because of damping introduced by the material forming flexible diaphragm 200. The user feel may be adjusted by selecting from among the various thicknesses and durometers of materials from which flexible diaphragm 200 is formed.

Figure 8:
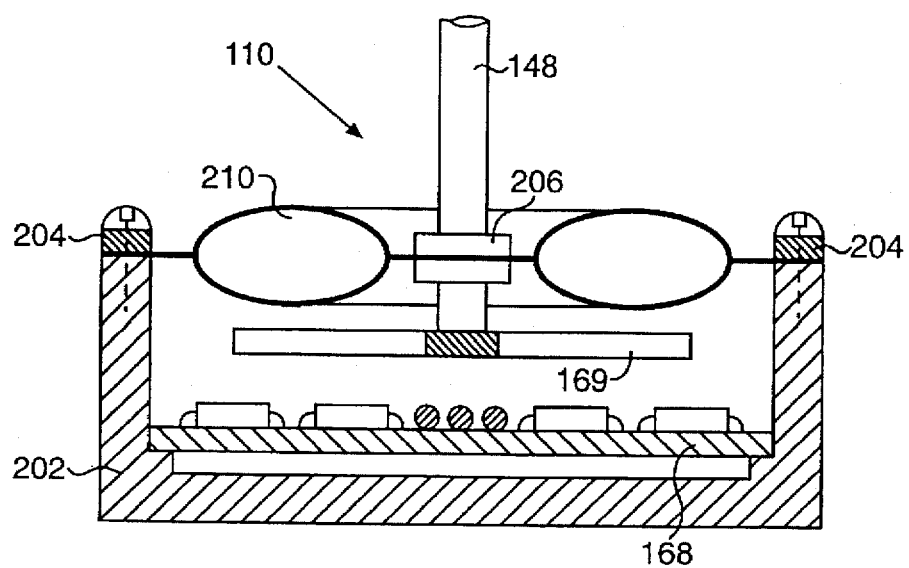
FIG. 8 is a cross-sectional side view of the discrete inductor embodiment of the six axis joystick of FIG. 5, in which the spring is replaced by a rubber bladder.

FIG. 8 shows a second alternative embodiment of six axis joystick 110 of FIG. 7 in which flexible diaphragm 200 is replaced by a rubber bladder 210. Further benefits of rubber bladder 210 include improved vertical stability that reduces "sagging" of swash plate 142 toward circuit board 168 and "tunable" user feel provided by varying an inflation pressure of rubber bladder 210.

Figure 9A:
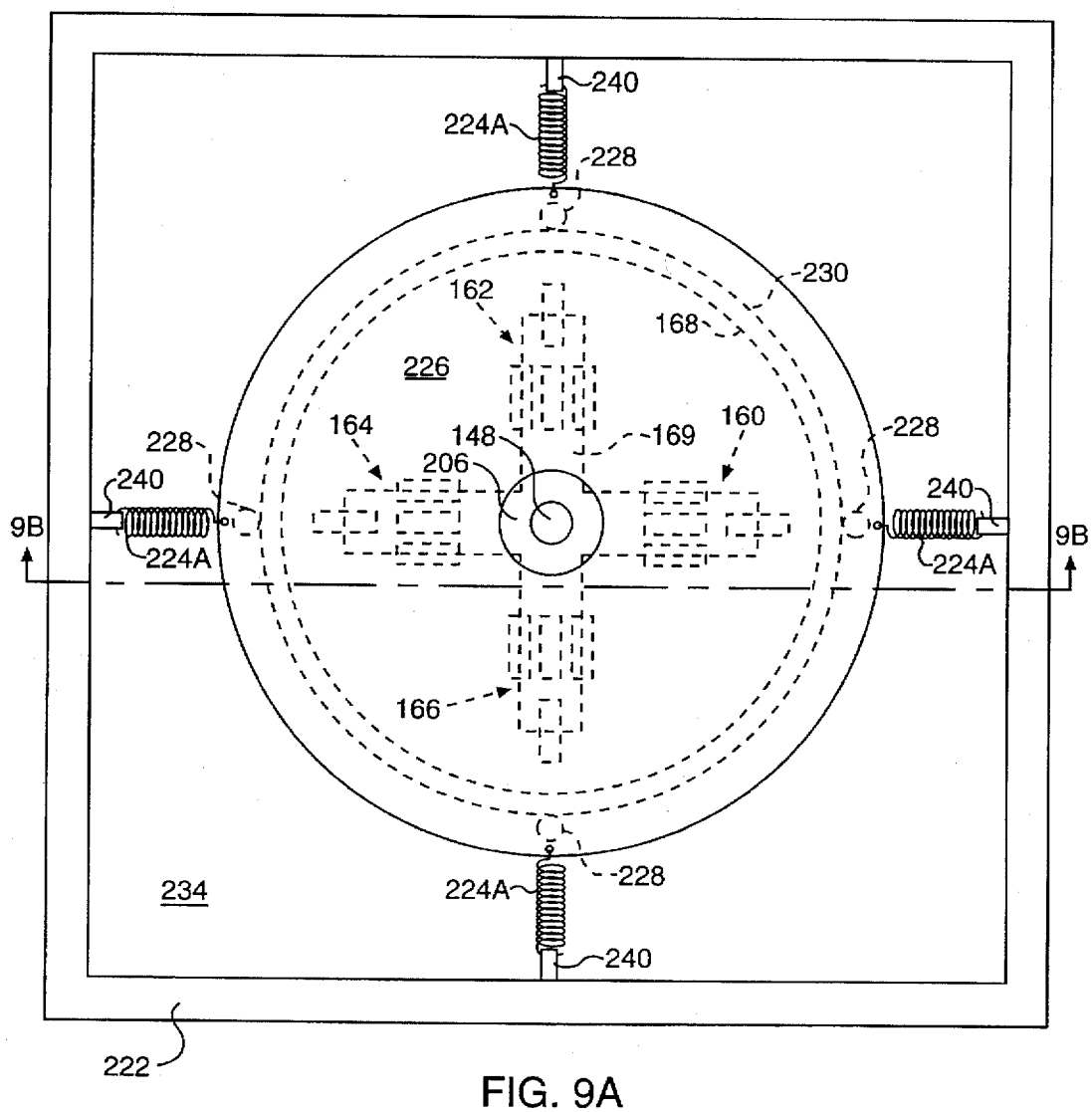
FIG. 9A is a top plan view of a discrete inductor embodiment of the six axis joystick of FIG. 5 showing the swash plate mounted in a suspension cage that is suspended in a housing by a network of springs.
Figure 9B:
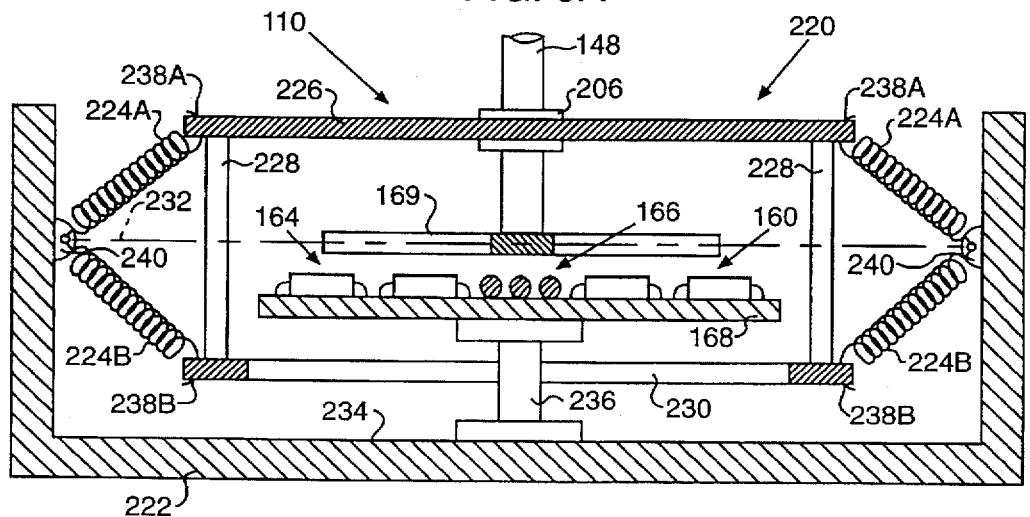
FIG. 9B is a sectional side view taken along lines 9A—9A of FIG. 9A showing the swash plate mounted in the suspension cage, the housing, the network of springs, and the discrete inductors mounted to a circuit board.

FIGS. 9A and 9B show a preferred embodiment of six axis joystick 110 of FIG. 7 in which flexible diaphragm 200 is replaced by a suspension cage 220 that is suspended within a housing 222 by four sets of springs 224.

Suspension cage 220 includes a substantially circular top plate 226 that is rigidly spaced apart by four spacers 228 from a substantially circular open-bottom hoop 230. Collar 206 fastens actuator handle 148 to top plate 226 such that swash plate 169 is positioned substantially along a centerline 232 of suspension cage 220 (equidistant between top plate 226 and open-bottom hoop 230).

Circuit board 168 is rigidly suspended through open-bottom hoop 230 and above a floor 234 of housing 222 by a pedestal 236 that positions discrete inductor arrays 160, 162, 164, and 166 the preferred distance from swash plate 169.

Each set of springs 224 includes an upper spring 224A and a lower spring 224B. Each upper spring 224A is mechanically suspended between one of four mounting holes 238A in top plate 226 and an associated one of four mounting brackets 240 positioned along centerline 232 on housing 222. Likewise, each lower spring 224B is mechanically suspended between one of four mounting holes 238B in open-bottom hoop 230 and an associated one of the four mounting brackets 240. Mounting holes 238 are preferably positioned adjacent to spacers 228. The spacing between suspension cage 220 and housing 222 is such that each of upper springs 224A is preferably substantially orthogonal to its associated lower spring 224B. Moreover, each of the four sets of springs 224 is positioned about 90-degrees apart from one another around top plate 226, open-bottom hoop 230, and housing 222.

The benefits of suspension cage 220 include improved isolation of translational and rotational displacements, improved stability of and return to the equilibrium position, much improved user feel, and improved mechanical strength. It is envisioned that further improvements can be realized by replacing sets of springs 224 with flexible diaphragms or rubber bladders that extend laterally into retaining rings in housing 222.

Figure 10:
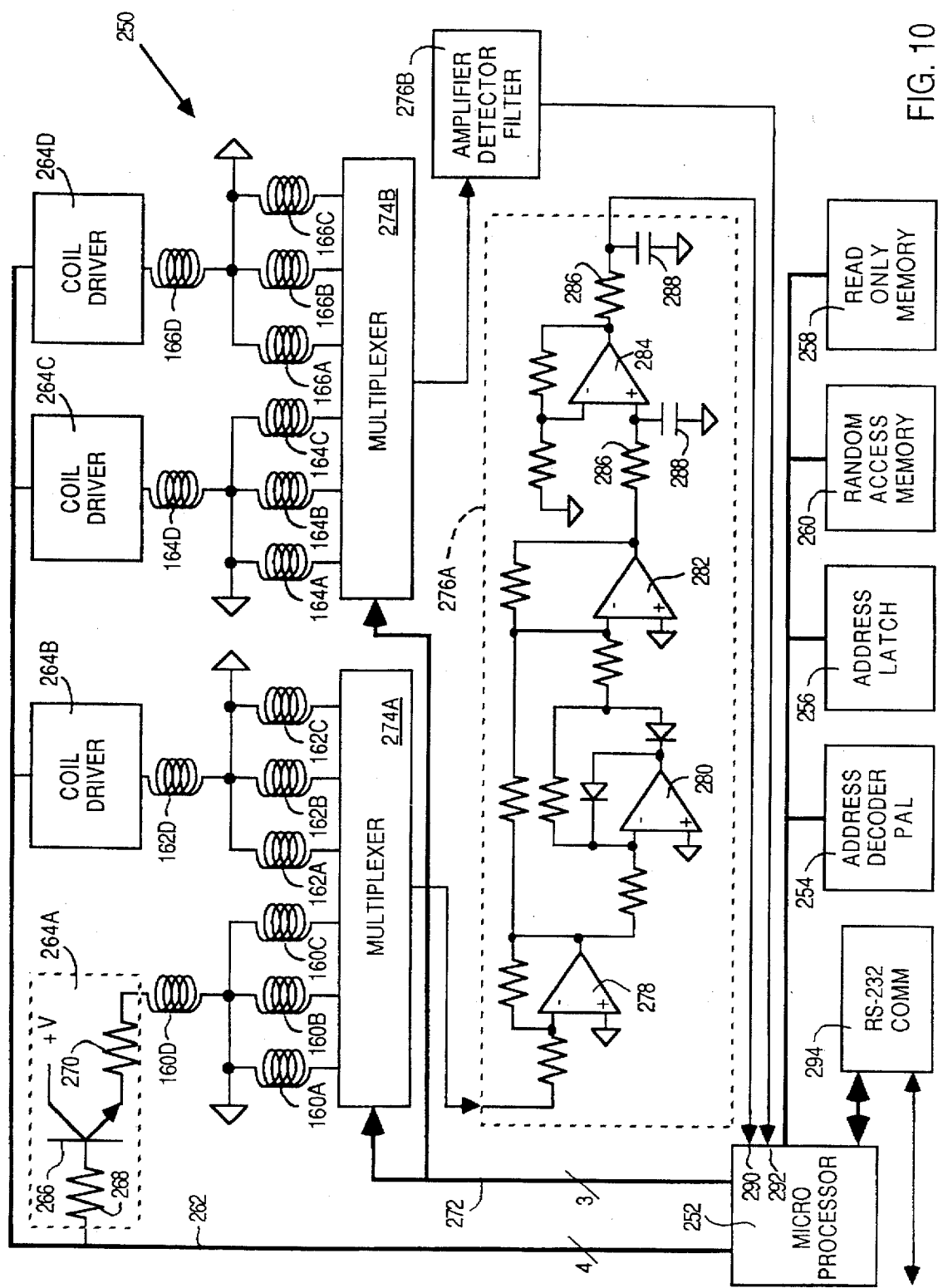
FIG. 10 is a combined simplified block and electrical circuit diagram showing a preferred embodiment of an embedded joystick controller of this invention.

FIG. 10 shows a preferred embedded joystick controller 250 suitable for use with six axis joystick 110 of FIGS. 5A and 5B. A Motorola type MC68HC11 microprocessor 252 is conventionally interconnected with a type 74HC138 address decoder PAL 254 and a type 74HC573 address latch 256 to access information stored in a type 27C256 read-only memory ("ROM") 258 and to store and access information in a type 62256 random-access memory ("RAM") 260.

A program stored in RAM 258 causes microprocessor 252 to sequentially provide 100 microsecond periods of 10 kilohertz energy on a driver bus 262 such that coil drivers 264A, 264B, 264C, and 264D (collectively "coil drivers 264") sequentially energize respective driver inductors 160D, 162D, 164D, and 166D, which each couple magnetic flux into an associated arm of swash plate 169. Each of coil drivers 264 includes a 2N3904 transistor 266, the base of which is driven by driver bus 262 through a 1,000 ohm resistor 268, and the emitter of which drives an associated one of driver inductors 160D, 162D, 164D, and 166D through a 100 ohm resistor 270.

Associated sets of sense inductors 160A–160C, 162A–162C, 164A–164C, and 166A–166C sequentially receive the 100 microsecond periods of magnetic flux by inductive coupling from swash plate 169. Of course, the degree of inductive coupling to each sense inductor, and the resulting signal current flowing in each sense inductor, depends on its distance from swash plate 169.

During each 100 microsecond period, microprocessor 252 also provides on a sampling bus 272 a 3-bit multiplexing address that causes a pair of LF13508 multiplexers 274A and 274B to sequentially sample the sense inductors for 15 microsecond periods. Multiplexer 274A samples sense inductors 160A–160C and 162A–162C, and multiplexer 274B simultaneously samples sense inductors 164A–164C and 166A–166C.

Multiplexers 274A and 274B provide their 15 microsecond signal current samples to substantially identical amplifier/detector/filter circuits 276A and 276B. (Because of the similiarity of circuits 276A and 276B, FIG. 11 shows in detail the electrical components only of circuit 276A.) Each signal current sample is converted to a signal voltage by an operational amplifier 278 having a closed-loop gain of about 1,000. A peak detector 280 and an inverting amplifier 282 provide a peak voltage value for each sample, which is subsequently filtered by a two-pole active filter 284 that preferably includes a pair of 100,000 ohm resistors in series with a corresponding pair of 0.1 microfarad capacitors. The resulting filtered peak signal voltages are connected to 8-bit analog-to-digital converter inputs 290 and 292 of microprocessor 252 for further processing.

The further processing entails employing the digitized peak voltage samples for each sense inductor as an address into a lookup table stored in ROM 258, which returns a value corresponding to the distance between swash plate 169 and the particular sense inductor being sampled. The returned values are collectively processed, either by an algorithm or preferably by a secondary lookup table, into spatial orientation data that represent the X-, Y-, Z-, roll-, pitch-, and yaw-axis orientations of swash plate 169.

The spatial orientation data are preferably transmitted by a MAX232 RS-232 communications controller 294 to a user device such as a personal computer.

Skilled workers will recognize that portions of this invention may be implemented differently from the implementations described above. For example, the actuator handle may be in the form of a "T" bar, a trigger grip handle, or a knob-topped handle. The joystick may also include added buttons and/or switches. Moreover, the actuator handle may freely or frictionally rotate in the yaw-axis direction with or without a separate spring return to the equilibrium position.

While X-, Y-, Z-, roll-, pitch-, and yaw-axis designations used in this application are like those used in aircraft, other axis conventions and orientations are possible for this invention.

The physical dimensions, sizes, shapes, and spacings described may be widely varied to adapt to the needs of particular applications.

Likewise, the embedded controller need not be embedded and may employ other than 8-bits of analog-to-digital conversion, may be programmed to provide axis rate-of-change output data, and may employ various different components and component values and various combinations of equivalent analog and digital circuits to perform the described functions. Of course, many different combinations of multiplexing, scanning, and sampling frequencies, may be employed to achieve substantially the same results.

Finally, the RS-232 communications controller may be replaced with one of various interconnect technologies, including a parallel interface, a network controller, current loop wiring, twisted pairs of wires, a fiber-optic link, and an infrared link.

It will be obvious to those having skill in the art that many changes may be made to the details of the above-described embodiments of this invention without departing from the underlying principles thereof. Accordingly, it will be appreciated that this invention is also applicable to data input applications other than those found in computers. The scope of the present invention should, therefore, be determined only by the following claims.

We claim:

1. A multiple axis data input apparatus, comprising:
   a source of magnetic flux;
   a swash plate coupled to the magnetic flux and positionable by an actuator handle in an orientation having a predetermined number of axes, the predetermined number being at least four;
   multiple sensors positioned in proximity to the swash plate and positioned such that each sensor receives an amount of the magnetic flux that depends on an orientation-induced spacing between the swash plate and the sensor and in which each sensor generates a signal in response to the amount of magnetic flux received; and
   a controller that receives and processes the signals and generates spatial orientation data corresponding to the orientation of the swash plate in each of the predetermined number of axes.

2. The apparatus of claim 1 in which the predetermined number of axes is at least four, and the at least four axes are selected from a group consisting of an X-translation axis, a Y-translation axis, a Z-translation axis, a roll-axis, a pitch-axis, and a yaw-axis.

3. The apparatus of claim 1 in which the predetermined number of axes is six, and the six axes include an X-translation axis, a Y-translation axis, a Z-translation axis, a roll-axis, a pitch-axis, and a yaw-axis.

4. The apparatus of claim 1 in which the source of magnetic flux is an electromagnet that is inductively coupled to the swash plate.

5. The apparatus of claim 1 in which the source of magnetic flux is at least one discrete inductor that is coupled to the sensors by the swash plate.

6. The apparatus of claim 1 in which the swash plate has four radially orthogonal arms each having an associated end and a periphery, and the multiple sensors comprise four arrays of discrete inductors positioned such that each array of discrete inductors is separated from the periphery of the associated end of each arm of the swash plate by the orientation-induced spacing.

7. The apparatus of claim 6 in which the controller samples the signals with a multiplexer and employs a microprocessor accessing a first lookup table to generate distance data related to each of the sampled signals.

8. The apparatus of claim 7 in which the microprocessor generates the spatial orientation data by employing the distance data to access a second lookup table.

9. The apparatus of claim 1 in which the source of magnetic flux is one or more permanent magnets that are mechanically coupled to the swash plate.

10. The apparatus of claim 1 in which the swash plate is suspended in the magnetic flux by a suspension means that acts to position the swash plate in an equilibrium position.

11. The apparatus of claim 10 in which the suspension means includes one of a compression spring, a flexible diaphragm, a bladder, and a suspension cage.

12. The apparatus of claim 1 in which the controller further includes a driver for activating the source of magnetic flux.

13. The apparatus of claim 1 in which the controller processes the signals with a peak detector, a filter, and an analog-to-digital converter to generate distance data related to each of the signals, and further employs the distance data to access a lookup table that returns information for generating the spatial orientation data.

14. The apparatus of claim 1 in which the controller generates spatial orientation data for at least one of the axes by employing a common-mode signal derived from the signals received from at least two of the sensors.

15. The apparatus of claim 1 in which the controller generates spatial orientation data for a Z-translation axis by employing a common-mode signal derived from the signals employed to generate spatial orientation data for at least one of a roll-axis and a pitch-axis.

16. In a multiple axis data input apparatus, a method of generating spatial orientation data, comprising:
   positioning a source of magnetic flux;

coupling the magnetic flux to a swash plate positionable in an orientation having a predetermined number of axes, the predetermined number being at least four;

distributing multiple sensors in proximity to the swash plate such that each sensor receives an amount of the conveyed magnetic flux that depends on an orientation-induced spacing between the swash plate and the sensor;

generating in each sensor a signal in response to the amount of magnetic flux received; and processing the signals to generate spatial orientation data corresponding to the orientation of the swash plate in each of the predetermined number of axes.

17. The method of claim 16 in which the predetermined number of axes are selected from a group consisting of an X-translation axis, a Y-translation axis, a Z-translation axis, a roll-axis, a pitch-axis, and a yaw-axis.

18. The method of claim 16 further including coupling inductively the source of magnetic flux to the swash plate.

19. The method of claim 16 in which the swash plate has four radially orthogonal arms each having an associated end and a periphery, and the multiple sensors comprise four arrays of discrete inductors positioned such that each array of discrete inductors is separated from the periphery of the associated end of each arm of the swash plate by the orientation-induced spacing, the processing step further including:

sampling the signals with a multiplexer;
detecting a peak amplitude of each of the sampled signals;
converting the peak amplitude of each of the sampled signals into distance data; and
processing the distance data with a microprocessor and a lookup table to generate the spatial orientation data.

20. The method of claim 16 further including suspending in an equilibrium position the swash plate in the magnetic flux, and providing a restoring force that acts to position the swash plate in the equilibrium position.

21. The method of claim 16 in which the processing step further includes deriving a common-mode signal from the signals received from at least two of the sensors and generating therefrom spatial orientation data for at least one of the axes.

22. The method of claim 16 in which the processing step further includes deriving a common-mode signal from the signals employed to generate spatial orientation data for at least one of a roll-axis and a pitch-axis and generating therefrom spatial orientation data for a Z-translation axis.

23. A multiple axis data input apparatus, comprising:
providing a source of magnetic flux;
a suspension cage positionable by an actuator handle in an orientation having at least four axes, at least three of the axes being substantially mutually perpendicular;
a swash plate coupled to the magnetic flux and positioned within and mechanically coupled to the suspension cage; and
multiple sensors positioned within the suspension cage in proximity to the swash plate and distributed such that each sensor receives an amount of the magnetic flux that depends on an orientation-induced spacing between the swash plate and the sensor and in which each sensor generates a signal in response to the amount of magnetic flux received.

24. The apparatus of claim 23 further including a controller that receives and processes the signals and generates spatial orientation data corresponding to the orientation of the swash plate.

25. The apparatus of claim 23 in which the at least four axes are selected from among an X-translation axis, a Y-translation axis, a Z-translation axis, a roll-axis, a pitch-axis, and a yaw-axis.

26. The apparatus of claim 23 in which the actuator handle is one of a "T" bar handle, a trigger grip handle, and a knob-topped handle.

27. The apparatus of claim 23 in which the suspension cage suspends the swash plate in an equilibrium position, and the actuator handle further rotates the swash plate in a rotational axis direction without a restoring force acting to return the swash plate to the equilibrium position.

28. The apparatus of claim 23 in which the sensors are discrete inductors mounted on a circuit board that is positioned within the suspension cage.

29. The apparatus of claim 28 in which the swash plate is positioned by the suspension cage in an equilibrium position that separates the swash plate from the discrete inductors by a distance of about 0.5 centimeters to about 2.0 centimeters.

30. The apparatus of claim 23 in which the source of magnetic flux is located within the suspension cage.

31. The apparatus of claim 30 in which the source of magnetic flux is at least one discrete inductor mounted on the circuit board.

32. The apparatus of claim 30 in which the source of magnetic flux is at least one permanent magnet mounted on the swash plate.

33. The apparatus of claim 23 in which the swash plate is positioned at a substantially centered location within the suspension cage.

34. The apparatus of claim 23 further including a housing and in which the suspension cage is suspended in an equilibrium position within the housing by a restoring force means.

35. The apparatus of claim 34 in which the restoring force means is attached between the housing and the suspension cage and includes at least one of a set of springs, a flexible diaphragm, and a rubber bladder.

36. The apparatus of claim 34 in which the restoring force means includes a first rubber bladder that is attached between the housing and a first portion of the suspension cage, and a second rubber bladder that is attached between the housing and a second portion of the suspension cage, the first and second portions being on opposite sides of a centerline running through a length of the swash plate.

37. The apparatus of 34 in which the restoring force means includes a rubber bladder having an settable inflation pressure that provides a tunable amount of positional stability to the swash plate and a tunable user feel to the actuator handle.

38. A multiple axis data input apparatus, comprising:
a source of magnetic flux;
a swash plate having four radial arms each with an associated end and a periphery, the swash plate coupled to the magnetic flux and positionable by an actuator handle in an orientation having a predetermined number of axes, the predetermined number being at least four;
four arrays of discrete inductors positioned in proximity to the swash plate and positioned such that each array of discrete inductors is separated from the periphery of the associated end of each arm of the swash plate by an orientation-induced spacing that causes each inductor to receive an amount of the magnetic flux that depends on the orientation-induced spacing, each inductor generating a signal in response to the amount of the magnetic flux received; and a controller that receives and processes the signals and generates spatial orientation data corresponding to the orientation of the swash plate in each of the predetermined number of axes.

39. In a multiple axis data input apparatus, a method of generating spatial orientation data, comprising:

positioning a source of magnetic flux;

coupling the magnetic flux to a swash plate having four radial arms each including an associated end and a periphery, the swash plate positionable in an orientation having a predetermined number of axes, the predetermined number being at least four;

distributing four arrays of discrete inductors such that each inductor is separated from the periphery of the associated end of each arm of the swash plate by an orientation-induced spacing that causes each inductor to receive an amount of the magnetic flux that depends on the orientation-induced spacing between the periphery of the associated end of each arm of the swash plate and the inductor;

generating in each inductor a signal in response to the amount of magnetic flux received;

sampling the signals with a multiplexer;

detecting a peak amplitude of each of the sampled signals;

converting the peak amplitude of each of the sampled signals into distance data; and processing the distance data with a microprocessor and a lookup table to generate the spatial orientation data.

40. A multiple axis data input apparatus, comprising:

a source of electromagnetic flux;

a plate having at least four radially separated surfaces, the plate coupled to the source of electromagnetic flux and positionable by an actuator handle in an orientation having a predetermined number of axes, the predetermined number being at least four;

at least four sensors positioned in proximity to the radially separated surfaces such that each of the sensors is separated from an associated surface of the plate by an orientation-induced spacing that causes each sensor to receive an amount of the electromagnetic flux that depends on the orientation-induced spacing, each sensor generating a signal in response to the amount of the electromagnetic flux received; and a controller that receives and processes the signals and generates spatial orientation data corresponding to the orientation of the plate in each of the predetermined number of axes.

41. In a multiple axis data input apparatus, a method of generating spatial orientation data, comprising:

positioning a source of electromagnetic flux;

coupling the magnetic flux to a plate having at least four radially separated surfaces, the plate positionable in an orientation having a predetermined number of axes, the predetermined number being at least four;

distributing at least four sensors such that each sensor is separated from an associated surface the swash plate by an orientation-induced spacing that causes each sensor to receive an amount of the electromagnetic flux that depends on the orientation-induced spacing;

generating in each sensor a signal in response to the amount of electromagnetic flux received; and processing each signal with a lookup table to generate the spatial orientation data.

* * * * *